United States Patent
Azuma et al.

(10) Patent No.: US 8,388,536 B2
(45) Date of Patent: Mar. 5, 2013

(54) ULTRASONIC IMAGING APPARATUS

(75) Inventors: Takashi Azuma, Kodaira (JP); Shinichiro Umemura, Sendai (JP)

(73) Assignee: Hitachi Medical Corporation, Tokyo (JP)

(*) Notice: Subject to any disclaimer, the term of this patent is extended or adjusted under 35 U.S.C. 154(b) by 655 days.

(21) Appl. No.: 12/545,975

(22) Filed: Aug. 24, 2009

(65) Prior Publication Data

US 2010/0099986 A1    Apr. 22, 2010

(30) Foreign Application Priority Data

Sep. 12, 2008  (JP) ................................. 2008-235594

(51) Int. Cl.
  *A61B 8/00*  (2006.01)
(52) U.S. Cl. ........ 600/443; 600/458; 600/459; 382/128; 382/279
(58) Field of Classification Search .................. 600/443, 600/458, 459; 382/128, 279
  See application file for complete search history.

(56) References Cited

U.S. PATENT DOCUMENTS

| | | | |
|---|---|---|---|
| 6,095,980 A | | 8/2000 | Burns et al. |
| 6,926,671 B2 * | | 8/2005 | Azuma et al. ................. 600/459 |
| 2008/0221449 A1 * | | 9/2008 | Sato ............................. 600/442 |

OTHER PUBLICATIONS

Newhouse et al., "Second Harmonic Doppler Ultrasound Blood Perfusion Measurement", IEEE, 1992 Ultrasonics Symosium, pp. 1175-1177.
Umemura et al., "Triplet Pulse Sequence for Superior Microbubble/Tissue Contrast", IEEE, 2003 Ultrasonics Symosium, pp. 429-432.
Brouakaz et al., "Chirp Reversal Ultrasound Contrast Imaging", IEEE, 2006 Ultrasonics Symosium, pp. 224-227.

* cited by examiner

*Primary Examiner* — Brian Casler
*Assistant Examiner* — Daniel Huntley
(74) *Attorney, Agent, or Firm* — Antonelli, Terry, Stout & Kraus, LLP.

(57) ABSTRACT

In an ultrasonic contrast imaging method in which signals specific to a contrast agent are extracted to form an image, imaging is performed with the following three well-balanced properties: frame rate, spatial resolution, and contrast-agent selectivity. A first chirp signal whose frequency increases with time and a second chirp signal obtained by inverting the first chirp signal about the time axis are used, and they are individually transmitted and received. A decoder having decode filters each adapted for a coded sequence, which is obtained when the chirp signal is decomposed into a pulse signal and a coded sequence, is provided. The decode filters are adapted for echo signals received in response to two chirp signals, respectively, and outputs of the two decode filters are input to a subtractor, whereby the difference therebetween is determined. Thus, contrast-agent selectivity is balanced with spatial resolution.

9 Claims, 12 Drawing Sheets

(a)

(b)

(a)

(b)

(c)

(a)

(b)

(c)

ULTRASONIC IMAGING APPARATUS

BACKGROUND OF THE INVENTION

1. Field of the Invention

The present invention relates to an ultrasonic technique that images the interior of a living body by transmitting and receiving ultrasound to and from the living body. In particular, the invention relates to an ultrasonic imaging technique that performs imaging with the use of a microbubble contrast agent.

2. Background Art

Ultrasonic imaging apparatuses that image the interior of a living body by transmitting and receiving pulsed ultrasound to and from the living body have been widely used for medical diagnoses.

Among imaging modalities, in the fields of X-rays and MRI in particular, contrast agents have previously been used for imaging a blood circulatory system and the like. The object of using such contrast agents is to obtain a contrast-enhanced image of the structure or distribution of a blood circulatory system by administering the contrast agents into the blood and thereby to diagnose diseases that are reflected by a blood circulatory system such as malignant tumors or infarctions with high accuracy.

In the meanwhile, contrast agents have not been widely used for ultrasonic diagnoses so far. These years, however, they have become to be widely used with the advent of contrast agents formulated by stabilizing fine bubbles (microbubbles) on the order of micrometers in size with some methods. The principle of microbubbles is as follows: microbubbles with a diameter of about one micrometer resonate with ultrasound with a frequency of several MHz, which is used for ultrasonic diagnoses, and thereby oscillating with large amplitude; consequently, ultrasound within such a frequency range is scattered well, increasing contrast sensitivity.

Microbubble ultrasound contrast agents are characterized by the strong non-linearity. This is due to the property of microbubbles that they expand in volume under negative pressure much more than they contract under positive pressure with the same amplitude. Accordingly, echo signals scattered from microbubbles include many second harmonic components that have a frequency two times that of a transmitted signal. V. L. Newhouse et al. reported a method of obtaining a Doppler signal of a blood flow that emphasizes soft tissue based on such second harmonic components, for the first time in 1992 (see Non-Patent Document 1, for example).

P. N. Burns et al. have proposed a pulse inversion method in which two times of transmission/reception are performed using transmission sound-pressure pulse waveforms whose polarities are inverted with respect to each other, and two echo signals obtained thereby are summed (see Patent Document 1, for example). By such summation, the fundamental components of the echo signals received from soft tissue whose motion can be disregarded will be cancelled out because a signal that is shifted in phase by 180° is added. Meanwhile, the second harmonic components will grow twice as large because a signal that is shifted in phase by 360° is added. Although the number of required transmissions increases double, it is in principle possible to eliminate the fundamental components from soft tissue without using a bandpass filter. Thus, second harmonic echo signals with excellent axial resolution can be obtained. As for a scatterer such as a microbubble contrast agent in a blood flow, of which changes occurring during the two times of transmission/reception cannot be disregarded, fundamental echo signals emitted from the scatterer cannot be completely cancelled out. However, the method of P. N. Burns is rather suited for the current objective of obtaining an echo signal that emphasizes a contrast agent relative to soft tissue.

Umemura reports in Non-Patent Document 2 a method of differentiating a contrast signal and a non-linear living-body signal by summing echo signals, which have been obtained as a result of performing three times of transmission/reception using pulses whose phases are shifted by 0°, 120°, and 240°. According to such a method, it is possible to cancel out second harmonics that have a constant phase relationship with the fundamental wave, concurrently with the fundamental wave. With such properties, it is possible to distinguish between second harmonics (e.g., second harmonics received from a contrast agent) whose phase does not have a constant relationship with a transmitted wave and second harmonics received from living-body tissue.

Bouakaz reports a method (see Non-Patent Document 3, for example) that includes transmitting and receiving a first chirp signal and transmitting and receiving a second chirp signal that is obtained by inverting the first chirp signal about the time axis, wherein a cross-correlation function (a first cross-correlation function) for a signal, which is obtained by inverting the first transmission signal on the time axis, and a signal received in response to the first transmission is determined, a cross-correlation function (a second cross-correlation function) for a signal, which is obtained by inverting the second transmission signal on the time axis, and a signal received in response to the second transmission is determined, and the difference between the first cross-correlation function and the second cross-correlation function is determined. When such a method is used, echo signals received from the respective microbubbles will differ from each other because the timing at which the frequency of the first chirp signal coincides with the resonance frequency of the microbubbles differs from that of the second chirp signal.

| [Patent Document 1] | U.S. Pat. No. 6,095,980 |
|---|---|
| [Non-Patent Document 1] | 1992 IEEE Ultrasonics Symposium Proceedings, pp. 1175-1177 |
| [Non-Patent Document 2] | 2003 IEEE Ultrasonics Symposium Proceedings, pp. 429-432 |
| [Non-Patent Document 3] | 2006 IEEE Ultrasonics Symposium Proceedings, pp. 224-227 |

SUMMARY OF THE INVENTION

Although the method of Umemura is superior in the property of distinguinig between a contrast signal and a non-linear living-body signal, it requires three times of transmission/reception. Meanwhile, the method of Bouakaz, which involves only two times of transmission/reception, is advantageous in the frame rate. However, when a chirp signal is used as it is, the spatial resolution could be significantly low. Thus, an auto-correlation function is applied after the reception of the signal, and pulse compression is performed thereto on the time axis. By such pulse compression, spatial resolution is significantly improved as compared to the case in which a chirp signal is used as it is. However, if an auto-correlation function is applied in the case in which imaging is performed by using the full frequency bandwidth of an ultrasonic probe, the auto-correlation function could function as a bandpass filter on the frequency axis, which could result in a decreased bandwidth. For this reason, the problem of the deterioration of the spatial resolution could not have been solved.

In view of the foregoing circumstances, it is an object of the present invention to detect echo components that are produced and scattered from a microbubble contrast agent and to provide an ultrasonic imaging technique that solves the deterioration of the spatial resolution.

In the present invention, a chirp signal is produced as a convolution of a pulse waveform with a coding signal, and instead of performing pulse compression to the chirp signal using an auto-correlation function for the chirp signal itself, pulse-compression is performed to the coding signal.

An ultrasonic imaging apparatus of the present invention includes a transmitter configured to transmit to a test subject a first chirp signal whose frequency increases monotonically with time and a second chirp signal whose frequency decreases monotonically with time, a receiver configured to receive from the test subject a first reception signal resulting from the first chirp signal and a second reception signal resulting from the second chirp signal, a decoder that includes a first decode filter produced based on a first coding signal, the first coding signal producing the first chirp signal by being convolved with a first pulse signal, and also includes a second decode filter produced based on a second coding signal, the second coding signal producing the second chirp signal by being convolved with a second pulse signal, the decoder being configured to convolve the first reception signal with the first decode filter to output a first convolution signal, and to convolve the second reception signal with the second decode filter to output a second convolution signal, and a subtractor that performs subtraction processing to the first convolution signal and the second convolution signal.

The first chirp signal and the second chirp signal can be signals that are inverted with respect to each other about the time axis. Each decode filter can be an auto-correlation function for the coding signal or a mismatched filter for the coding signal.

Preferably, an adder is also provided that is configured to add the first convolution signal to the second convolution signal. Then, the output of the subtractor is defined as a contrast signal, whereas the output of the adder is defined as a tissue signal, and superimposed images of the signals are displayed on a display.

According to the present invention, it is possible to distinguish between non-linear component echoes that are produced from a living body as a result of non-linear propagation of a transmission pulse and echo signals produced from a contrast agent, whereby the frame rate and spatial resolution that are at equal levels to those of conventional imaging methods in which no contrast agent is used are achieved.

DETAILED DESCRIPTION OF THE PREFERRED EMBODIMENTS

Hereinafter, embodiments of the present invention will be described with reference to the drawings.

Figure 1:
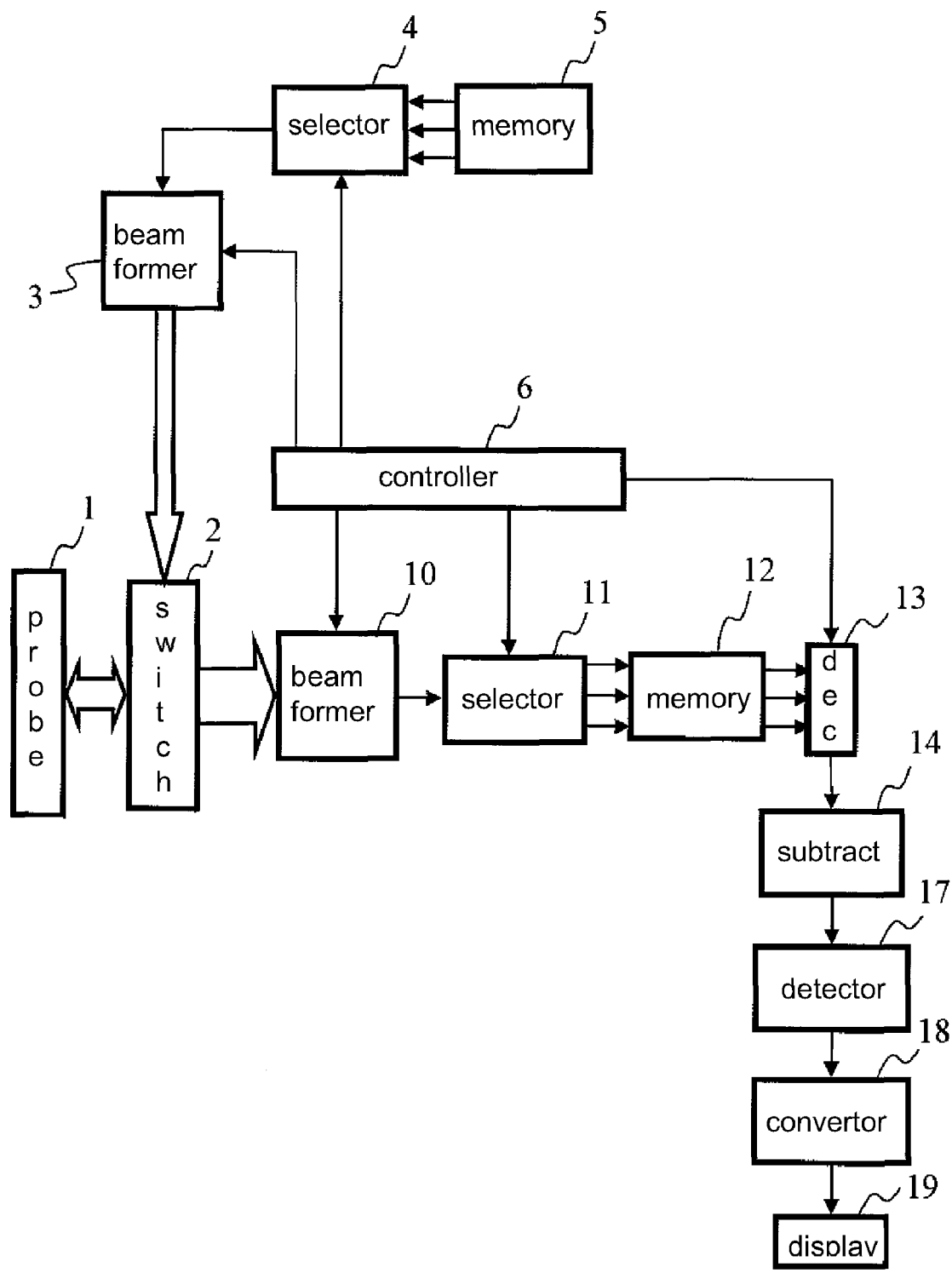
FIG. 1 is a block diagram showing an exemplary configuration of an ultrasonic imaging apparatus in accordance with the present invention.

FIG. 1 is a block diagram showing an exemplary ultrasonic imaging apparatus of the present invention. Each element that constitutes an ultrasonic probe 1 is connected to a transmission beamformer 3 and a reception beamformer 10 via a switch 2. The transmission beamformer 3, under the control of a sequence controller 6, produces a signal using a waveform that has been selected and read from a transmission waveform memory 5 by a transmission waveform selector 4 so that the signal can be an ultrasonic pulse having directionality when transmitted via each element. Such a signal is converted into an ultrasonic pulse by each element of the ultrasonic probe 1 and transmitted to a living body. An ultrasonic echo signal, which has been reflected or scattered within the living body and thus has returned to the ultrasonic probe 1, is received by each element therein and converted into an electric signal.

The reception beamformer 10, under the control of the sequence controller 6, provides a delay time to each of the received signals and sums such signals in order to create reception sensitivity with directionality. A time-series signal obtained by summing such delays is, under the control of the sequence controller 6, once written to a bank of a reception waveform memory 12 selected by a reception waveform selector 11. The waveform in the memory 12 is subjected to pulse-compression by a decoder 13 corresponding to chirp signals. Then, a subtractor 14 subtracts one of a pair of decoded chirp signals from the other. An output signal of the subtractor is converted into an envelope signal by an envelope detector 17, and is then input to a scan converter 18. The scan converter 18 produces and controls signals so that two-dimensional or three-dimensional images are displayed on a display 19.

Figure 2:
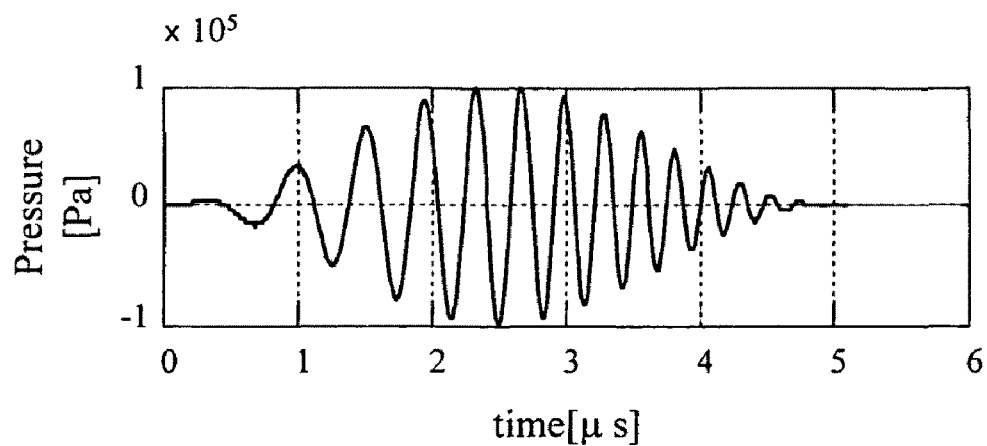
FIG. 2 are diagrams each showing an exemplary transmission waveform of a chirp signal.
Figure 2:
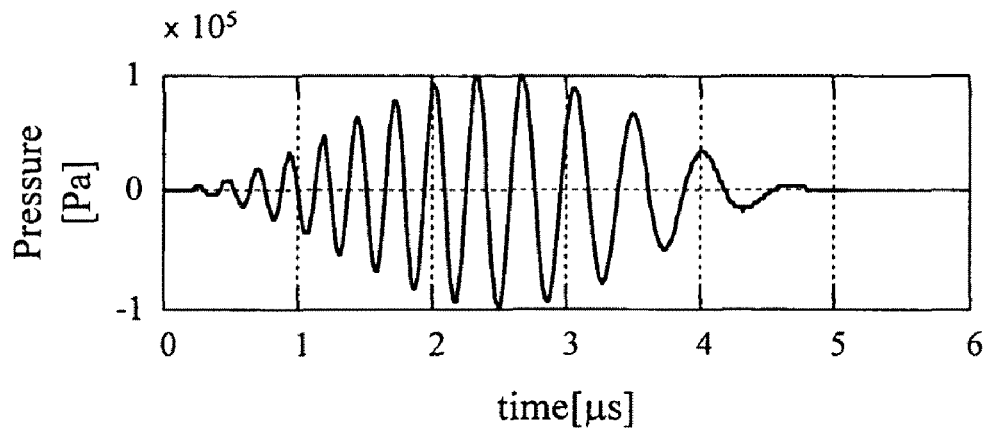
Figure 3:
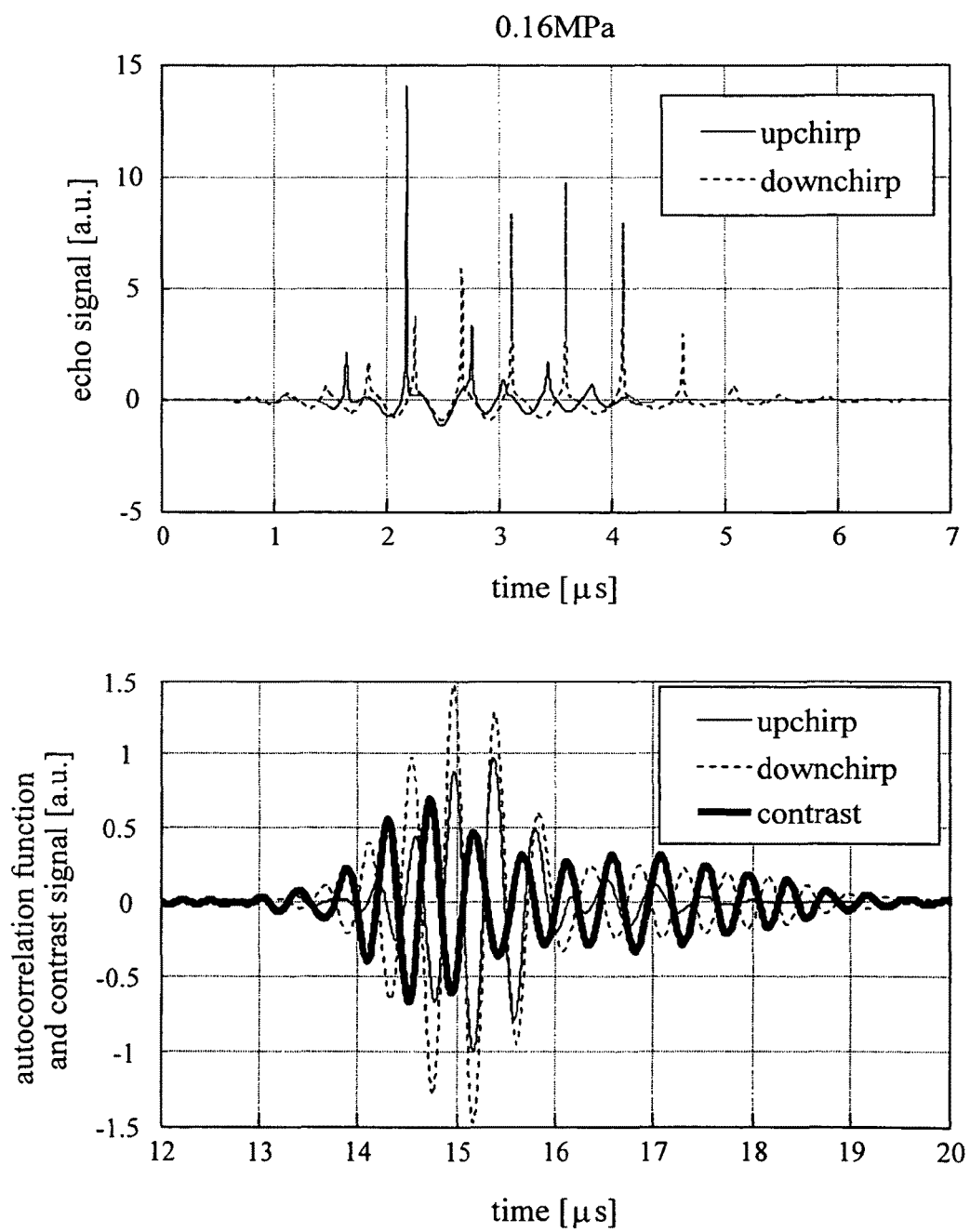
FIG. 3 are diagrams showing oscillation and reception waveforms of microbubbles and the calculation result of numeric values related to an auto-correlation output (at high sound pressure).
Figure 4:
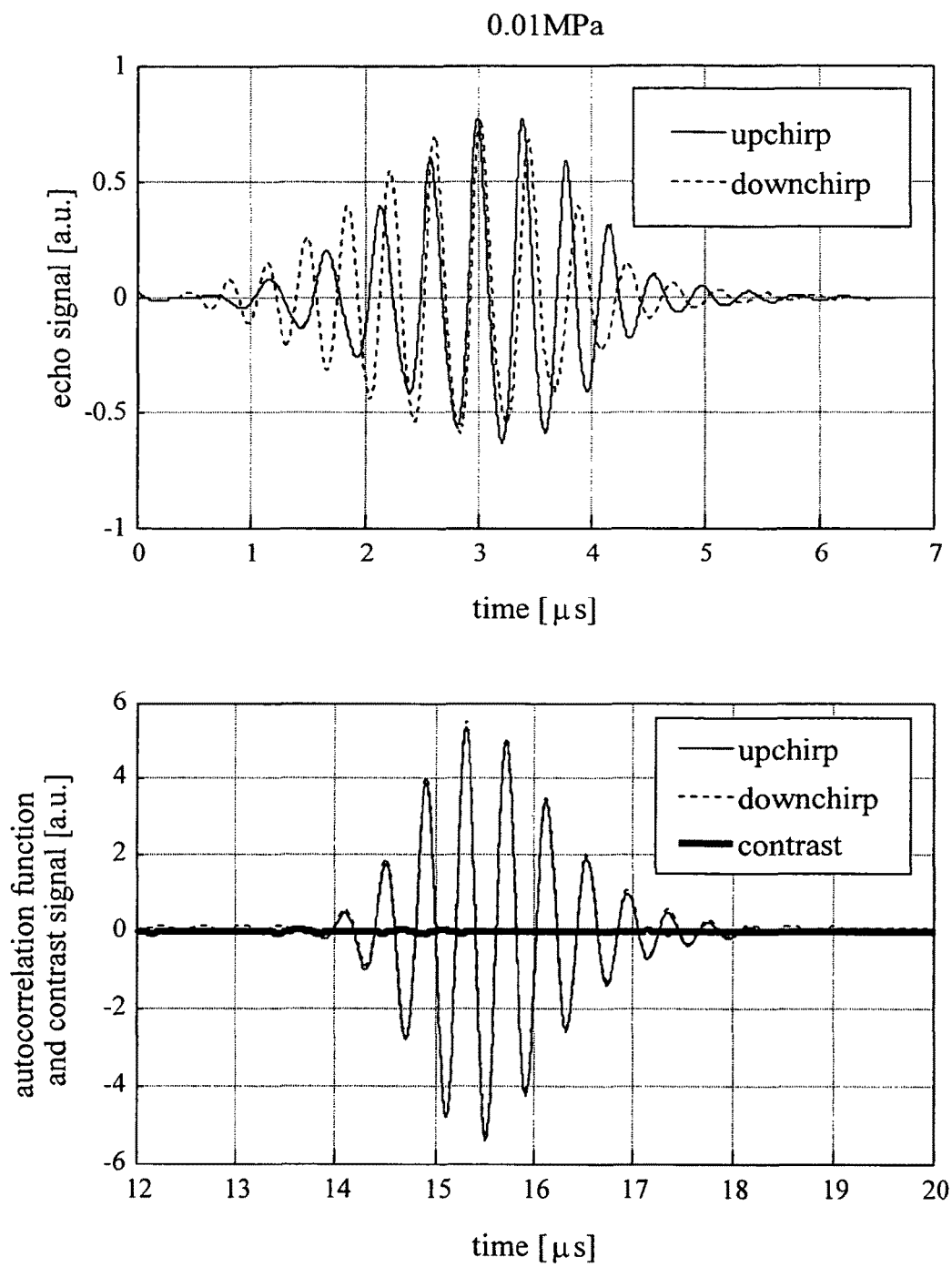
FIG. 4 are diagrams showing oscillation and reception waveforms of microbubbles and the calculation result of numeric values related to an auto-correlation output (at low sound pressure).

The following sequence is executed: two ultrasonic chirp waveforms that are inverted with respect to each other about the time axis as shown in FIGS. 2A and 2B are written to the transmission waveform memory 5 in advance, and one of them is selected by the transmission waveform selector 4 to be transmitted and received. FIGS. 3 and 4 show the calculation results of the numerical simulation of the microbubble response when such waveforms are used. Hereinafter, a chirp signal whose frequency increases with time will be referred to as an "up-chirp" and a chirp signal whose frequency decreases with time will be referred to as a "down-chirp." The upper diagrams of FIGS. 3 and 4 show the calculation results of the temporal change of the diameters of microbubbles in response to an up-chirp and a down-chirp, using a Rayleigh-Plesset equation with a Runge-Kutta method. FIGS. 3 and 4 differ in that FIG. 3 show the results when relatively high sound pressure (0.16 MPa) is applied while FIG. 4 show the results when relatively low sound pressure (0.01 MPa) is applied.

Figure 5:
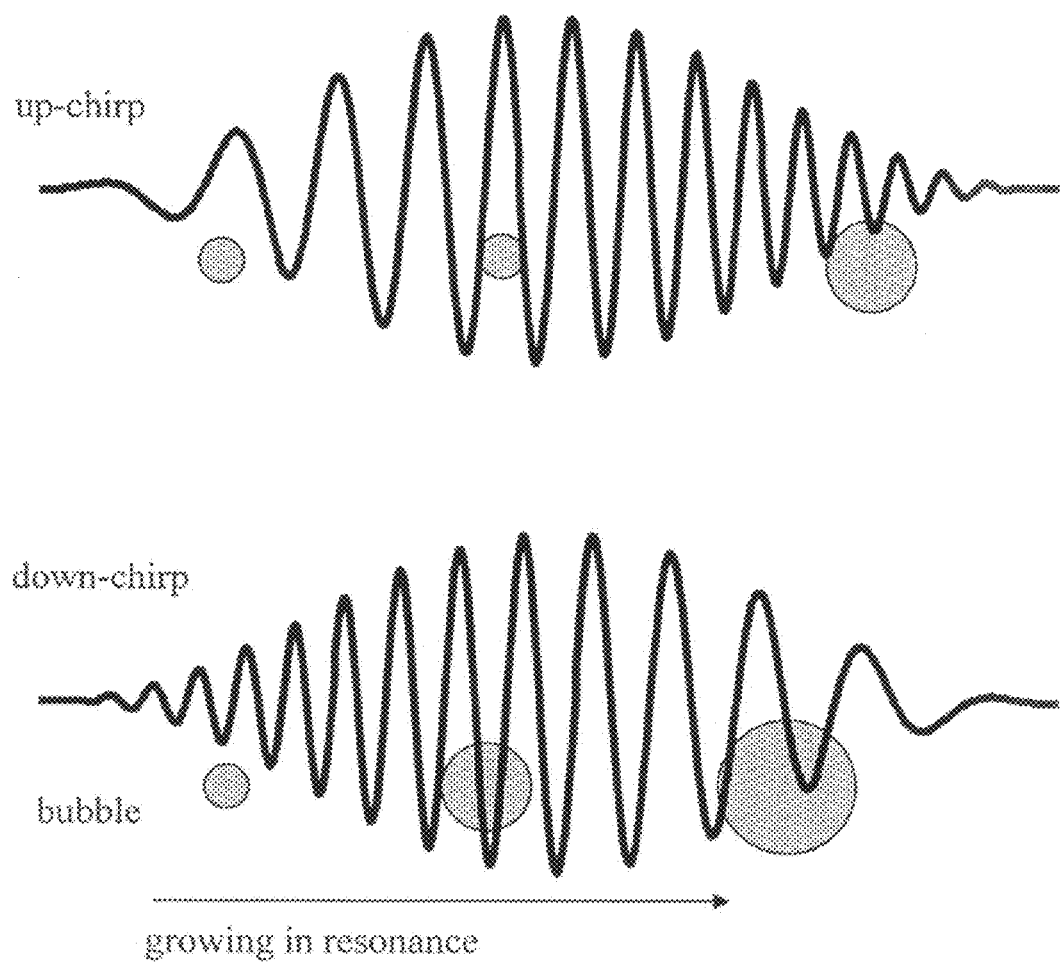
FIG. 5 are conceptual diagrams of the present invention.

In FIG. 3, the time in which the diameters of microbubbles are maximum differs between an up-chirp and a down-chirp. This demonstrates that the idea of using an imaging method in which high selectivity of contrast agents is achieved with the use of chirp signals as shown in FIG. 5 is correct. That is, in the case of a down-chirp whose initial frequency is close to the resonance frequency of bubbles, the frequency of the transmitted wave will decrease in accordance with the frequency change due to the resonance. Thus, bubbles are constantly excited. Meanwhile, in the case of an up-chirp, the frequency of only the latter part of the chirp waveform coincides with the resonance point. Thus, unlike the down-chirp, the up-chirp has little effect that bubbles are excited for a long time. Such a difference will result in a difference between the response to an up-chirp and the response to a down-chirp. When the difference therebetween is determined, signals from the contrast agent will be distinguished from the signals from the living body.

The lower diagrams of FIGS. 3 and 4 show the auto-correlation outputs for the up-chirp and the down-chirp and the difference between the two auto-correlation function outputs. At low sound pressure, non-linear oscillation that is specific to contrast agents is not prominent. Thus, the difference is substantially zero. Meanwhile, at high sound pressure, the signal will not disappear even if the difference is determined. Such a difference shows the difference of the contrast agent response to the sound pressure as well as the difference between the action of the present sequence on a living body and that on a contrast agent.

Although described here is an example in which an up-chirp and a down-chirp have a relationship such that they are inverted with respect to each other about the time axis, they need not be exactly inverted about the time axis. When signals other than contrast agent components are to be suppressed with the use of the difference between the auto-correlation functions for an up-chirp and a down-chirp, the auto-correlation functions for the up-chirp and the down-chirp will be the same. Thus, it is necessary that the up-chirp and the down-chirp be waveforms that are inverted with respect to each other about the time axis. However, in the present invention, the difference between an output of a mismatched filter corresponding to an up-chirp and a coded sequence of the up-chirp and an output of a mismatched filter corresponding to a down-chirp and a coded sequence of the down-chirp is determined. Thus, by adjusting the shapes of the two mismatched filters, it becomes possible to eliminate the need for the up-chirp and the down-chirp to have a relationship such that they are inverted with respect to each other about the time axis.

In the present invention, pulse compression is performed without the use of an auto-correlation function for a chirp signal itself. A chirp signal can be regarded as the result of convolution of a pulse waveform, which has a narrower bandwidth than the bandwidth of an ultrasonic probe, with a coded sequence. Accordingly, it follows that the compression operation for a chirp signal on the time axis can be performed not by compressing the chirp signal but by decoding a coded sequence and converting it into the pulse waveform. Thus, instead of using the aforementioned auto-correlation outputs, it is possible to use an output signal of a decode filter for a coded sequence corresponding to a chirp signal. Accordingly, it is possible to overcome the drawbacks of the method of Bouakaz that, when a chirp signal is time-compressed, the bandwidth could become narrower due to the bandwidth of the auto-correlation function.

Figure 6:
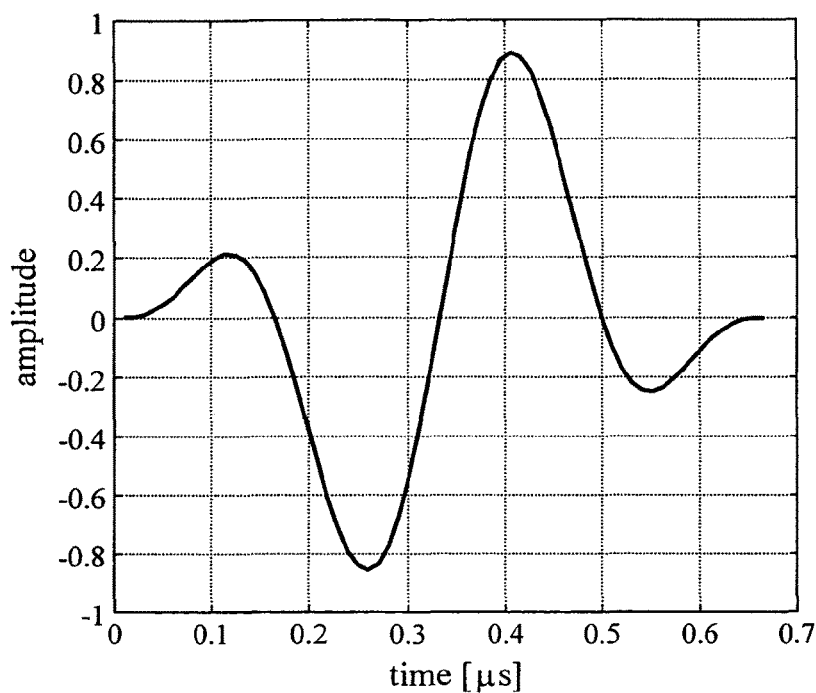
FIG. 6 is a diagram showing an exemplary shape of a pulse waveform used in the present invention.
Figure 7:
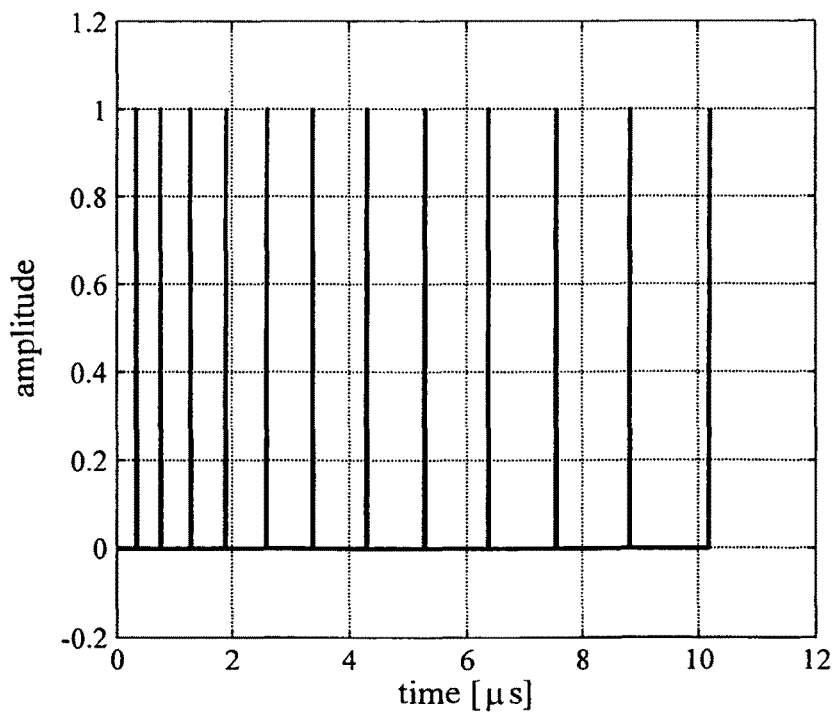
FIG. 7 is a diagram showing an exemplary coded sequence used in the present invention.
Figure 8:
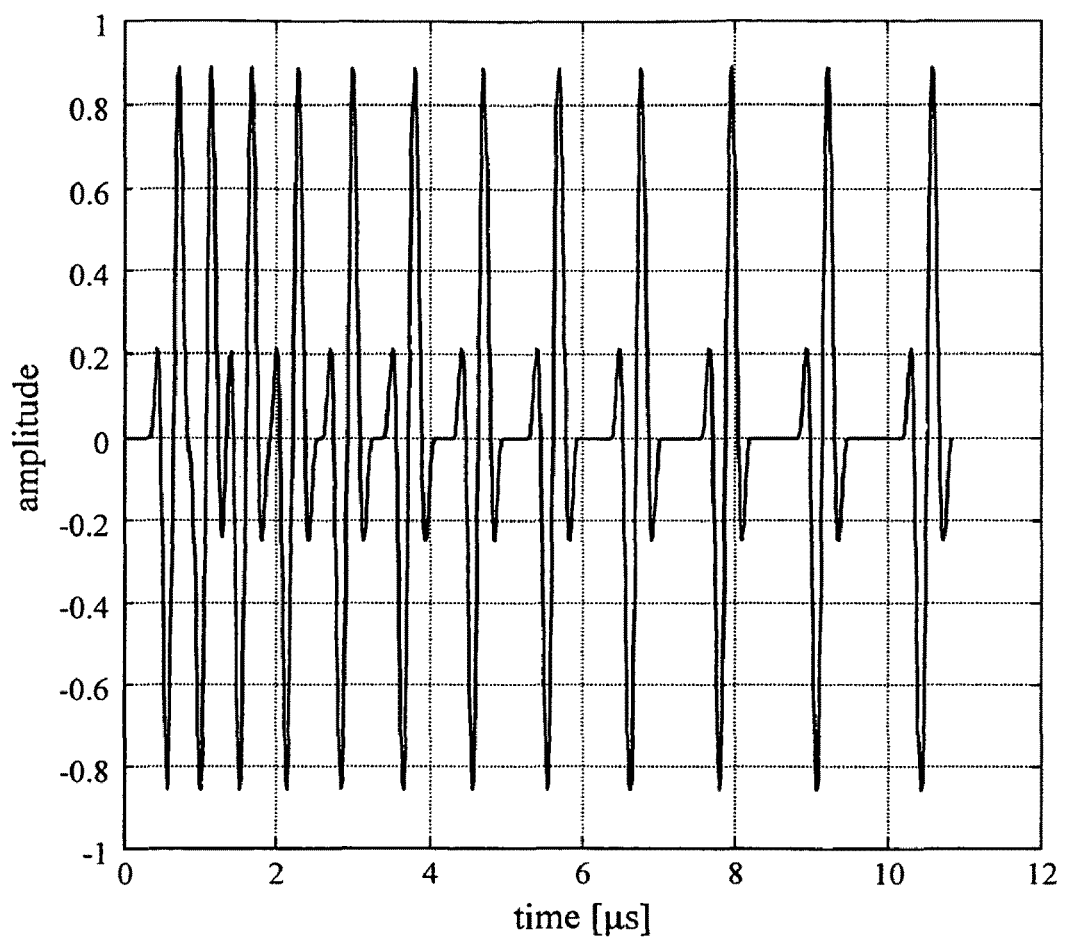
FIG. 8 is a diagram showing an exemplary transmission waveform of a chirp signal of the present invention.
Figure 9:
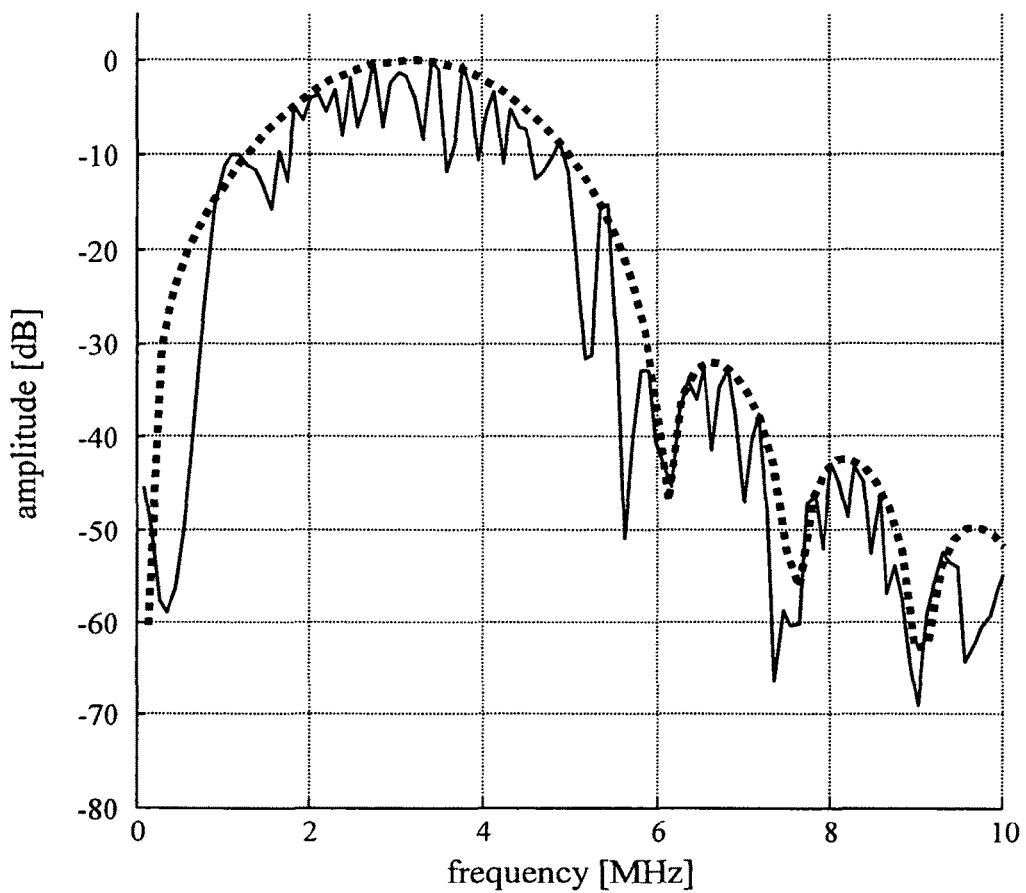
FIG. 9 shows exemplary frequency characteristics of a pulse waveform and a chirp signal of the present invention.

Hereinafter, description will be made of an example of the actual waveform. FIG. 6 shows a pulse waveform obtained by multiplying a sine wave with a center frequency of 3 MHz by a Hann window function. FIG. 7 shows an example of a coded sequence for producing a chirp signal by being convolved with the pulse waveform of FIG. 6. FIG. 8 shows a chirp signal produced by convoluting the pulse waveform of FIG. 6 with the coded sequence of FIG. 7. FIG. 9 shows the results of Fourier transformation of the pulse waveform and the chirp signal. The dotted line represents the Fourier-transformed pulse waveform, and the solid line represents the Fourier-transformed chirp signal. Although the chirp signal contains some ripples, the approximate frequency characteristics thereof overlap with those of the pulse. The "approximate frequency characteristics" as used herein mean that the frequency characteristics of the chirp signal when ripples that are small (i.e., ripples of about 10 dB) compared to a dynamic frequency range of 40 dB or 60 dB are not taken into consideration are close to the frequency characteristics of the pulse. In addition, convolution is equal to multiplication in the frequency domain. Thus, the fact that the bandwidth of the coded sequence after the convolution remains unchanged means that the bandwidth of the coded sequence is sufficiently wider than those of the pulse and the chirp signal. In addition, by adjusting the intervals between the codes and the size of the numerical value of the coded sequence (in this example, all codes are "1"), it is possible to adjust the size of ripples on the frequency characteristics. Imaging is performed through two times of transmission/reception using the following two signals: the chirp signal produced by convoluting a pulse waveform with a coded sequence and a second chirp signal produced by convoluting a second coded sequence, which is obtained by inverting the coded sequence about the time axis, with a pulse waveform. The pulse waveforms herein are desirably a common pulse waveform. When transmission/reception are performed twice in this manner, waveforms after being decoded will be pulse waveforms. Thus, if the waveforms after being decoded differ between the two times of transmission/reception, it would be difficult to suppress signals from a living body (i.e., other than the contrast agent components) by the subtraction processing with the subtractor, and to extract the contrast agent components.

Described next is a method of compressing a coded sequence on the time axis (decoding method) using a mismatched filter. Provided that a coded sequence is represented by B, a decode filter is represented by f, and a decoded signal is represented by c, the decoded signal c is given by Formula (1). In the following description, symbol B shows multiple B and the decode filter f is a matrix of convolution, c, of f with the coded sequence; symbols c, f, and d represent vectors; and symbol "T" represents transposition.

Provided that the waveform that is desirable as the decoded signal C, i.e., a waveform whose width on the time axis is minimum is represented by d, the sum I of squares for errors of c and d is given by Formula (2). Symbol f that minimizes the sum I of squares for errors represents the mismatched filter.

$$c = (f_1, f_2, \ldots, f_m) \begin{pmatrix} b_1 & b_2 & \cdots & b_n & 0 & \cdots & 0 \\ 0 & b_1 & \ddots & & \ddots & \ddots & \vdots \\ \vdots & \ddots & \ddots & & \ddots & \ddots & 0 \\ 0 & \cdots & 0 & b_1 & b_2 & \cdots & b_n \end{pmatrix} = fB \quad (1)$$

$$I = \sum (c_i - d_i)^2 = (fB - d)(fB - d)^T \quad (2)$$
$$= fBB^T f^T - dB^T f^T - fBd^T + dd^T$$

When all of i's (i=1, 2, ..., m) of Formula (4) are determined from the conditions of Formula (3), Formula (5) results. Thus, f is determined as expressed by Formula (6).

$$\frac{\partial I}{\partial f_i} = 0 \quad (3)$$

$$\frac{\partial I}{\partial f_i} = B_i B^T f^T + fBB_i^T - dB_i^T - B_i d^T \quad (4)$$
$$= 2(fBB_i^T - dB_i^T) = 0$$

$$\begin{pmatrix} \frac{\partial I}{\partial f_1} \\ \frac{\partial I}{\partial f_2} \\ \vdots \\ \frac{\partial I}{\partial f_m} \end{pmatrix} = fBB^T - dB^T = 0 \quad (5)$$

$$f = dB^T (BB^T)^{-1} \quad (6)$$

Figure 10:
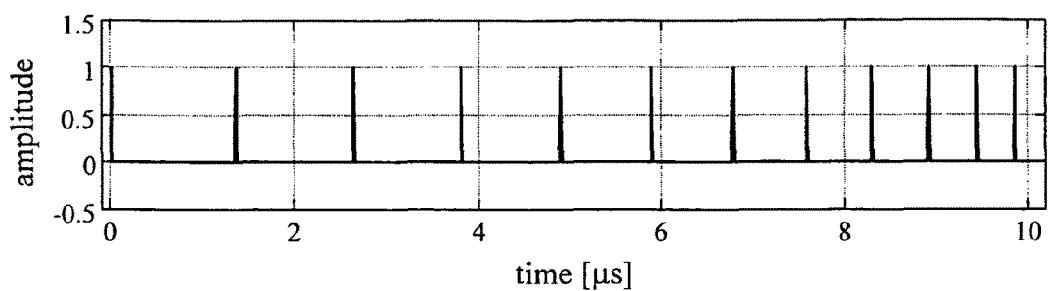
FIG. 10 are diagrams showing exemplary decode filters of the present invention.
Figure 10:
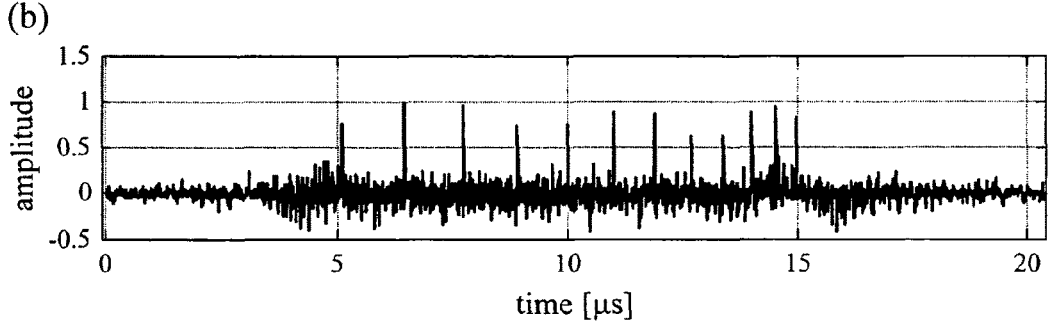
Figure 10:
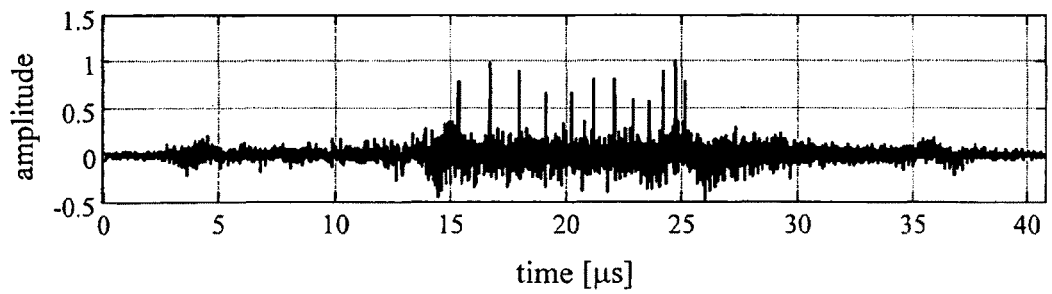
Figure 11:
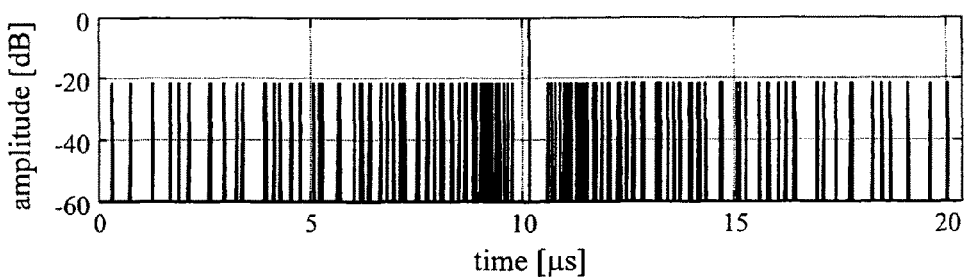
FIG. 11 are diagrams showing examples of the outputs of the decode filters of the present invention.
Figure 11:
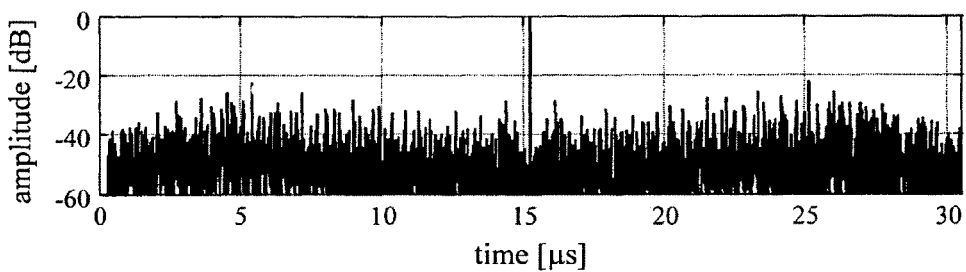
Figure 11:
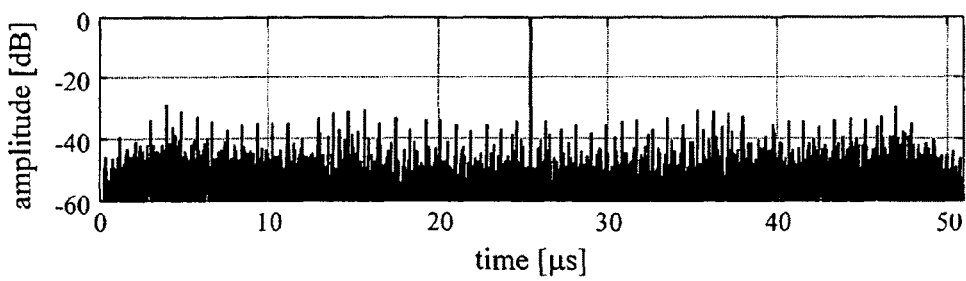

FIGS. 10 and 11 show examples of mismatched filters for the coded sequence of FIG. 7 and the results of pulse compression performed on the time axis with the use of the mismatched filters. As the number of taps of the mismatched filter is increased, unwanted response that would occur during pulse compression in the time axis direction can be reduced. FIG. 10A shows a case in which an auto-correlation function for the coded sequence of FIG. 7 is used as a decode filter, and FIGS. 10B and 10C each show a case in which a mismatched filter for the coded sequence of FIG. 7 is used. FIG. 10B is an example in which the number of taps is about 2000, and FIG. 10C is an example in which the number of taps is about 4000 (a single wavelength is sampled at 32 points).

FIGS. 11A to 11C show the outputs of the decode filters corresponding to FIGS. 10A to 10C, respectively. These outputs are the results of convolution of signals read from the reception waveform memory 12 with the corresponding decode filters. A signal at the center of each graph is a decoded signal, and signals other than that are unwanted responses. It can be seen that when an auto-correlation function for the coded sequence is used as a decode filter, the intensity of the unwanted response is about −20 dB, whereas when a mismatched filter with 2000 or 4000 taps is used, the unwanted response is suppressed. These calculation results can confirm that pulse compression for a coded sequence can be achieved not only by the method of performing pulse compression with the use of an auto-correlation function for a chirp signal itself but also by producing a chirp signal as a convolution of a pulse waveform with a coded sequence and performing pulse compression on the coded sequence, as in the present invention.

That is, when an auto-correlation function is used as a decode filter as in FIGS. 10A and 11A, an advantage is provided in that the size of the filter can be suppressed. However, the size of the unwanted response could be determined. When a dynamic rang of 60 dB to 100 dB is required as is the case with ultrasonic tomography imaging, for example, there are cases in which the size of the unwanted response cannot be disregarded. Meanwhile, in the case of using a mismatched filter, because of the large size of the filter, the required size of the memory becomes also large. However, an appropriate decode filter size, that is, memory size can be selected in accordance with the magnitude of the unwanted response that is necessary.

Figure 12:
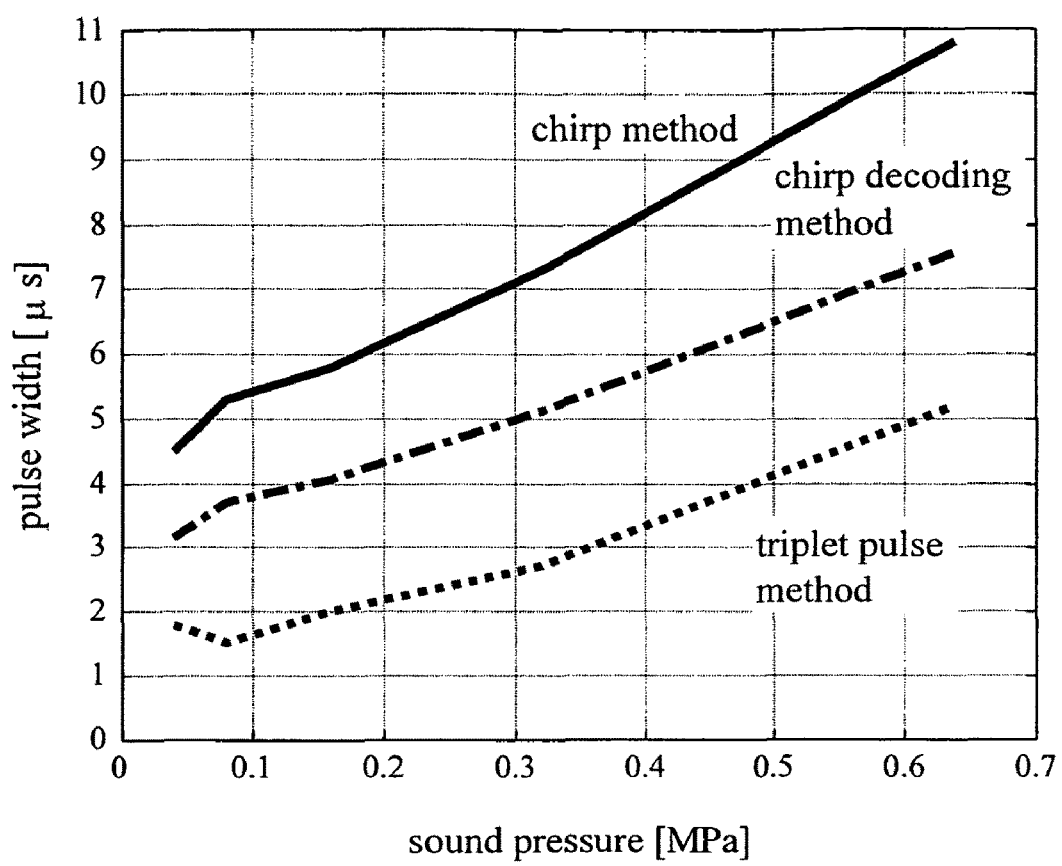
FIG. 12 is a diagram showing a pulse width of an auto-correlation output of the present invention.

FIG. 12 is a diagram showing the comparison results of the sound-pressure-dependence of the pulse width of a triplet pulse method and those of other sequences. In the triplet pulse method, the range of pulse widths is about 1.5 to 5 μs. In contrast, in the case of using an auto-correlation function for a chirp signal as exemplified by the method of Bouakaz, the range of pulse widths is as wide as 4 to 11 μs, which is two times that of the triplet pulse method. This means that the spatial resolution is deteriorated. Meanwhile, when a decode filter for a coded sequence of the present invention is used, it is possible to prevent the signal bandwidth from narrowing that could otherwise occur if an auto-correlation function for a chirp signal is used. Thus, a decrease in spatial resolution can be suppressed as shown in the drawings. Based on the aforementioned results, a contrast agent imaging method could have been proposed that can balance the temporal resolution (a small number of transmissions/receptions) with the spatial resolution.

Next, the second embodiment of the present invention will be described. In the aforementioned embodiment, imaging is performed by extracting only the contract agent components from echo signals. A contrast agent image is suitable for figuring out the shape of a blood vessel. However, in order to figure out the position of a blood vessel, i.e., the positional relationship between the blood vessel and a disease site such as the surrounding organs or tumors, it would be effective to display an image of body tissue, in a superimposed manner, in addition to the blood vessel image.

Figure 13:
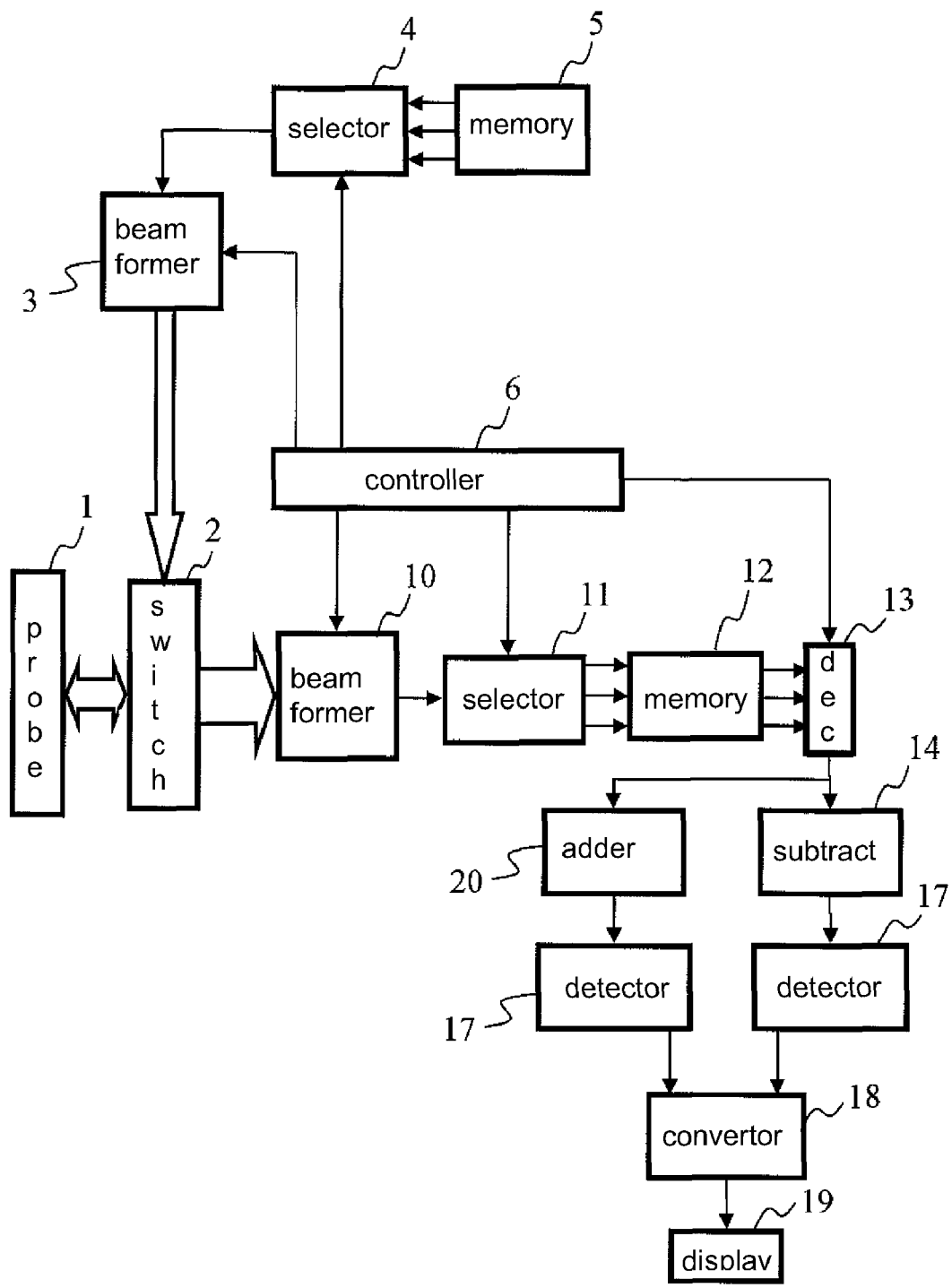
FIG. 13 is a block diagram showing another exemplary configuration of an ultrasonic imaging apparatus of the present invention.

FIG. 13 is a block diagram showing another example of an ultrasonic imaging apparatus of the present invention. Sequence of up to the following step is the same as that of the ultrasonic imaging apparatus shown in FIG. 1: a time-series signal obtained by phasing and adding ultrasonic echo signals, which have been received in response to the transmission of an up-chirp signal, and a time-series signal obtained by phasing and adding ultrasonic echo signals, which have been received in response to the transmission of a down-chirp signal, are once written to a bank of the reception waveform memory 12, and such signals are pulse-compressed by the decoder 13 corresponding to each of the chirp signals. Thus, description of the overlapped portions will be omitted.

In the apparatus shown in FIG. 13, the output of the decode filter 13 corresponding to the up-chirp and the down-chirp is branched to an adder 20 and the subtractor 14. The subtractor 14 calculates the difference between the decode filter outputs corresponding to the up-chirp and the down-chirp, thereby extracting contract agent components. The adder 20 sums the decode filter outputs corresponding to the up-chirp and the down-chirp, thereby extracting body tissue components. Each of the extracted components is imaged using a different color map, and the resulting images are superimposed, one on top of the other, on the scan converter 18 to form a final image.

Provided that the contrast agent components and the tissue signal included in the output of the decode filter for the echo signal of the up-chirp signal are represented by $A_{up}$ and $B_{up}$, respectively, and that the contract agent components and the tissue signal included in the output of the decode filter for the echo signal of the down-chirp signal are represented by $A_{down}$ and $B_{down}$, respectively, the tissue signal for the up-chirp can be expressed as $A_{up}+B$ and the tissue signal for the down-chirp can be expressed as $A_{down}+B$, as they do not differ greatly between the up-chirp and down-chirp. Accordingly, the subtractor provides an output of $A_{up}-A_{down}$, and the adder provides an output of $2B+A_{up}+A_{down}$ to $2B$. Thus, a tissue signal is extracted from the output of the adder 20 and contrast agent components are extracted from the output of the subtractor 14. It should be noted that since the waveforms of $A_{up}$ and $A_{down}$ greatly differ from each other, even when subtraction of $A_{up}-A_{down}$ is performed, the amplitude of the resulting signal will not be small.

| Description of Reference Numerals | |
|---|---|
| 1 | ultrasonic probe |
| 2 | switch |
| 3 | transmission beamformer |
| 4 | transmission waveform selector |
| 5 | transmission waveform memory |
| 6 | sequence controller |
| 10 | reception beamformer |
| 11 | reception waveform selector |
| 12 | reception waveform memory |
| 13 | decoder |
| 14 | subtractor |
| 17 | envelope detector |
| 18 | scan converter |
| 19 | display |
| 20 | adder |

What is claimed is:

1. An ultrasonic imaging apparatus comprising:
    a transmitter configured to transmit, to a test subject,
        a first chirp signal with a frequency that increases monotonically with time, the first chirp signal produced as a convolution of a first pulse signal with a first coding signal, and pulse compression is performed according to the first coding signal, and
        a second chirp signal with a frequency that decreases monotonically with time, the second chirp signal produced as a convolution of a second pulse signal with a second coding signal, and pulse compression is performed according to the second coding signal;
    a receiver configured to receive, from the test subject, a first reception signal resulting from the first chirp signal and a second reception signal resulting from the second chirp signal;
    a decoder that includes:
        a first decode filter based on the first coding signal,
        a second decode filter based on the second coding signal, and
        the decoder being configured to convolve the first reception signal with the first decode filter to output a first convolution signal, and to convolve the second reception signal with the second decode filter to output a second convolution signal; and
    a subtractor that performs subtraction processing in order to determine a difference between the first convolution signal and the second convolution signal.

2. The ultrasonic imaging apparatus according to claim 1, wherein the second chirp signal is a signal obtained by inverting the first chirp signal about a time axis.

3. The ultrasonic imaging apparatus according to claim 1, wherein the first decode filter is an auto-correlation function for the first coding signal, and the second decode filter is an auto-correlation function for the second coding signal.

4. The ultrasonic imaging apparatus according to claim 1, wherein the first decode filter is a mismatched filter for the first coding signal, and the second decode filter is a mismatched filter for the second coding signal.

5. The ultrasonic imaging apparatus according to claim 1, further comprising:
    an adder configured to add the first convolution signal to the second convolution signal; and
    a display configured to receive an output of the subtractor as a contrast signal, to receive an output of the adder as a tissue signal, and to display superimposed images of the signals.

6. The ultrasonic imaging apparatus according to claim 1, wherein the first pulse signal and the second pulse signal have a same waveform.

7. The ultrasonic imaging apparatus according to claim 1, wherein the bandwidth of the first reception signal is approximately equal to the bandwidth of the first convolution signal, and the bandwidth of the second reception signal is approximately equal to the bandwidth of the second convolution signal.

8. The ultrasonic imaging apparatus according to claim 1, wherein the bandwidth of the first coding signal is wider than the bandwidth of the first reception signal, and the bandwidth of the second coding signal is wider than the bandwidth of the second reception signal.

9. The ultrasonic imaging apparatus according to claim 1, wherein the bandwidth of the first coding signal is wider than the bandwidth of the first reception signal, and the bandwidth of the first reception signal is approximately equal to the bandwidth of the first convolution signal; and
    wherein the bandwidth of the second coding signal is wider than the bandwidth of the second reception signal, and the bandwidth of the second reception signal is approximately equal to the bandwidth of the second convolution signal.

* * * * *